(12) United States Patent
Ionkina et al.

(10) Patent No.: US 11,619,116 B2
(45) Date of Patent: Apr. 4, 2023

(54) NON-FLUID STIMULATION OF POROUS MEDIA

(71) Applicants: Natalya Ionkina, Calgary (CA); Valeriy Ionkin, Calgary (CA)

(72) Inventors: Natalya Ionkina, Calgary (CA); Valeriy Ionkin, Calgary (CA)

( * ) Notice: Subject to any disclaimer, the term of this patent is extended or adjusted under 35 U.S.C. 154(b) by 47 days.

(21) Appl. No.: 17/384,441

(22) Filed: Jul. 23, 2021

(65) Prior Publication Data
US 2022/0034199 A1    Feb. 3, 2022

Related U.S. Application Data

(60) Provisional application No. 63/058,940, filed on Jul. 30, 2020.

(51) Int. Cl.
*E21B 28/00* (2006.01)
*E21B 47/12* (2012.01)
(Continued)

(52) U.S. Cl.
CPC ............ *E21B 43/003* (2013.01); *E21B 28/00* (2013.01); *E21B 43/24* (2013.01); *E21B 43/26* (2013.01); *E21B 47/12* (2013.01)

(58) Field of Classification Search
CPC ........ E21B 43/00; E21B 328/00; E21B 43/24; E21B 47/12; E21B 47/138
See application file for complete search history.

(56) References Cited

U.S. PATENT DOCUMENTS

| 5,004,166 A | 4/1991 | Sellar |
| 8,813,838 B2 * | 8/2014 | Cavender .............. E21B 43/003 166/177.4 |

(Continued)

FOREIGN PATENT DOCUMENTS

CA     2637984 C    4/2015

OTHER PUBLICATIONS

Shichao Zheng et al., "Improvement of shale gas reservoir based on plasma pulse shock and frequency resonance technology", Journal of Natural Gas Science and Engineering, Jun. 3, 2020.

*Primary Examiner* — Catherine Loikith
(74) *Attorney, Agent, or Firm* — ATMAC Patent Services Ltd.; Andrew T. MacMillan

(57) ABSTRACT

Resonant sweeping frequencies are estimated for specific rock types, saturated with various formation fluids at reservoir conditions. A sequence and duration of resonant frequency sweeps and high amplitude low frequency vibration/agitation at each station is designed based on petrophysical and geomechanical properties, and in-situ stress conditions. Resonant sweeping and agitation is conducted as a multiple resonant frequency (fixed or variable) tool passes at optimal speed, which will be determined for specific reservoir type and downhole conditions. Resonant stimulation tool type, or combination of tools, is selected based on borehole size, reservoir parameters and resonant frequency requirements to maximize the efficiency of stimulation. Broad range of operating frequencies will allow to tune to resonant frequencies of various formation types (sandstones, limestones, shales, dolomites, and heterogeneous reservoirs comprised of the mixture of above lithologies). Low frequency transducers increase fluid displacement, and improve ultimate formation fluid recovery.

16 Claims, 10 Drawing Sheets

(51) Int. Cl.
*E21B 43/00* (2006.01)
*E21B 43/24* (2006.01)
*E21B 43/26* (2006.01)

(56) References Cited

U.S. PATENT DOCUMENTS

| | | | |
|---|---|---|---|
| 8,844,649 B2 * | 9/2014 | Benson | ............... E21B 34/00 175/57 |
| 9,567,819 B2 | 2/2017 | Cavender et al. | |
| 2015/0165445 A1 | 6/2015 | Baym et al. | |

* cited by examiner

NON-FLUID STIMULATION OF POROUS MEDIA

CROSS-REFERENCE TO RELATED APPLICATIONS

This application claims the benefit of priority of U.S. Provisional Application No. 63/058,940 filed Jul. 30, 2020, which is incorporated herein by reference.

BACKGROUND OF THE INVENTION

(1) Field of the Invention

The invention pertains generally to reservoir stimulation in the oil and gas industry, geothermal and agricultural industry, disposal industry and mining sector. More specifically, the invention relates to a process methodology and associated downhole apparatuses for non-fluid stimulation of porous media (reservoir stimulation).

(2) Description of the Related Art

The current mainstream approach for reservoir stimulation is hydraulic fracturing. These high-pressure stimulations require the injection of fluids and slurries typically composed of water, sand, hydrocarbons, solvents, or chemical solutions.

Drawbacks of hydraulic fracturing include induced regional seismicity, water resource limitations, cost and transportation of high volumes of water and proppant, well integrity/cement damage, large well surface site pads, and political sensitivity (anti-fracing campaigns). Additionally, hydraulic fracturing imparts permeability channels (fractures) into porous media (reservoirs) via the path of least resistance, dependent on rock and reservoir characteristics. This means the reservoir may not be evenly stimulated—stranding resource and reducing ultimate recoveries. Furthermore, as reservoirs deplete, many follow-up wells (child wells) show much reduced results than original (parent) wells when hydraulic fractured. In essence, child wells may exhibit 'frac hits' to other wells, causing inter-well communication and lack of reservoir stimulation.

BRIEF SUMMARY OF THE INVENTION

According to an exemplary embodiment of the invention there is disclosed a process methodology, including downhole apparatuses, for non-fluid stimulation of porous media (reservoir stimulation).

According to an exemplary embodiment of the invention there is disclosed a process and downhole equipment for non-fluid stimulation of hydrocarbon reservoirs utilizing acoustic waves at a reservoir resonant frequency, followed by high amplitude low frequency vibration, and heating.

According to an exemplary embodiment of the invention, disclosed is a process for non-fluid stimulation of reservoirs, such as oil, liquid rich, and gas shales, tight sandstones, limestones, heavy oil sands, or any type of porous media comprised of various lithofacies. According to exemplary embodiments, the methods and tools disclosed herein apply to and can be utilized in oil and gas (primary and enhanced recovery), geothermal, agricultural and downhole disposal applications. Downhole equipment is designed to supply energy in the form of acoustic waves at a reservoir resonant frequency, followed by high amplitude low frequency vibration, and heating. This process can be applied in all well configurations: horizontal, slanted, deviated and vertical, and the wells completed with a slotted liner or cased and perforated. An objective of some embodiments is to create a high-density network of interconnected microfractures, thereby increasing permeability, and reducing viscosity of produced hydrocarbons to improve inflow and reservoir performance.

In some embodiments, a process using equipment designed to supply energy in the form of acoustic waves at resonant frequency using acoustic generation or mechanical sources of energy. An objective is to create a high-density network of interconnected microfractures, causing slight to large-scale movements, depending on desired outcome or application.

Acoustic waves at resonant (natural) frequency of the reservoir create force that results in formation failure. The main failure modes of rocks are a) fatigue failure (cracking, breaking) and b) cohesive strength failure at planes of weakness. These failures result in the creation of a high-density network of interconnected microfractures and increases the permeability.

Disclosed according to some embodiments is a two-phase reservoir stimulation process starting with resonant stimulation (phase 1) using any of the tools described herein, or combination, and followed by reservoir heating (phase 2). Reservoir heating can be not utilized if sufficient efficiency is achieved by resonant stimulation.

High amplitude low frequency elastic vibrations further improve permeability of the reservoirs by decreasing cohesive bonding, adhesive bonding and capillary forces, creating changes in pore volume and pore fluid viscosity (molecular motion heating). The low frequency vibration releases trapped fluids as the result of poroelastic motion.

Reservoir heating at optimum temperatures (below hydrocarbon cracking temperatures) will vaporise bound fluids (clay and capillary bound water) and partially remove hydroxyl/structural water in the clay lattice. Free water will be produced along with hydrocarbons. Drying and desiccation of rocks will create additional cracks/microfractures and enhance reservoir permeability.

According to an exemplary embodiment of the invention, a reservoir stimulation process starts with resonant sweeping and high amplitude low frequency vibration, followed by desiccation and dewatering of reservoir by heating formation and extracting vaporized fluids at the surface. Additional to the process, vaporized fluids (steam) can be used to power a steam turbine generator at the surface to generate electricity or energy for heating. A part of the steam stream can be diverted to a cooling tower to condense steam into hot (60°-80°) water to be used as hydrothermal energy for agricultural needs (green houses, etc.) and residential/commercial dwellings. Light hydrocarbon fractions in downhole generated and produced steam are extracted by hydrocarbon trapping device or separator installed at the surface and clean steam is supplied to a steam turbine generator or a cooling tower.

In the example of a horizontal well, the non-fluid reservoir stimulation process starts with resonant sweeping and high amplitude low frequency vibration/agitation at stationary locations of the ION Eco-Stim tool (RFS-HALFV, MRT, AMRF, CTSV) or during continuous low speed movement of the tool from the toe to the heel of the wellbore.

In some embodiments, the well production is completed with reservoir heating by heating tube and dewatering with extraction of vaporized fluids by vacuum suction at the surface.

According to an exemplary embodiment, resonant sweeping frequencies are estimated for specific rock types, saturated with various formation fluids at reservoir conditions. A sequence and duration of resonant frequency sweeps and high amplitude low frequency vibration/agitation at each station is designed based on petrophysical and geomechanical properties, and in-situ stress conditions. Resonant sweeping and agitation are conducted as a multiple sonic tool passes at optimal speed, which will be determined for specific reservoir type and downhole conditions. The tool has two sections, which have multiple acoustic transducers with different ranges of operating frequencies. A resonant frequency sweeping cartridge utilizes acoustic transducers with a wide range of operating frequencies to accommodate resonant frequencies of various formation types (sandstones, limestones, shales, dolomites, and heterogeneous reservoirs comprised of the mixture of above lithologies). A high amplitude low frequency vibration section of the tool has acoustic transducers with lower operating frequency ranges that increase oil displacement, and ultimate recoveries.

According to an exemplary embodiment, double wall heating tubing (single wall heating tubing can be used) with slots (or perforations) allows heating of the reservoir and simultaneous hydrocarbon production through tubing and permits fines control. Multiple heating sections can be constructed with alteration of non-heating tubing sections to optimize energy consumption.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Downhole equipment and phase 1 stimulation processes of low permeability or damaged reservoirs with positive skin using various tools (RFS-HALFV, MRT, AMRF, CTSV) in preferred embodiments are detailed below.

RFS-HALFV—Resonant Sweeping—High Amplitude Low Frequency Vibration Tool

Figure 5:
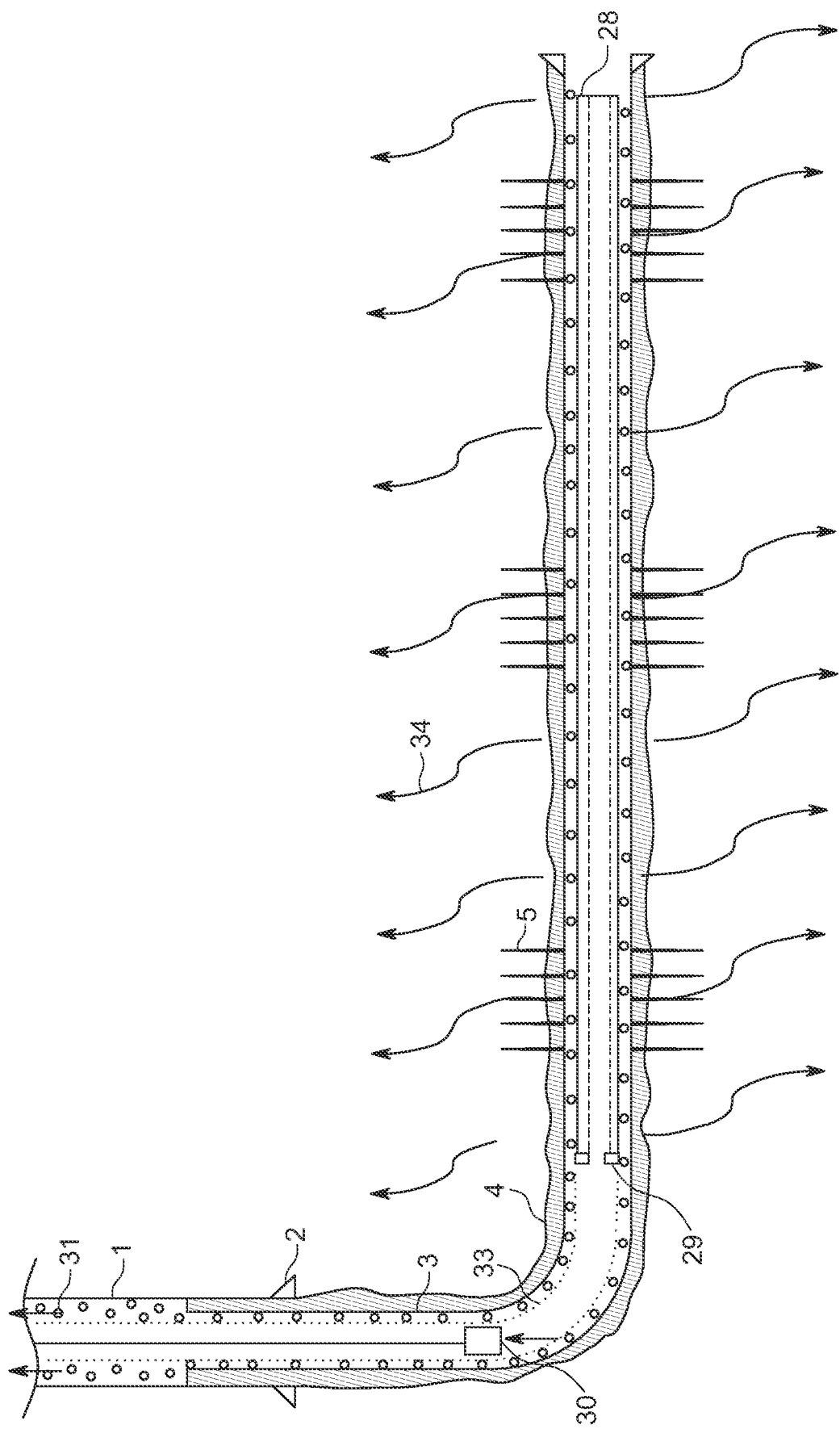
FIG. 5 illustrates a second phase of the non-fluid reservoir stimulation process utilizing heating tubing in a well with cemented and perforated production casing according to an exemplary embodiment.

According to an exemplary embodiment, a non-fluid reservoir stimulation process starts with resonant sweeping and high amplitude low frequency vibration/agitation (FIG. 1) at stationary locations 6 of the RFS-HALFV tool (FIG. 2, 3A, 3B, 4A, 4B) or during continuous low speed movement of the tool from the toe to the heel of the wellbore, and completed with reservoir heating by heating tube (FIG. 6A), and dewatering with extraction of vaporized fluids by vacuum suction at the surface during well production (FIG. 5).

Resonant sweeping frequencies will be calculated for specific rock types, saturated with various formation fluids at reservoir conditions. A sequence and duration of resonant frequency sweeps and high amplitude low frequency vibration/agitation at each station 6 will be designed based on petrophysical and geomechanical properties, and in-situ stress conditions. Resonant sweeping and agitation can be conducted as multiple sonic tool passes at optimal speed, which will be determined for specific reservoir type and downhole conditions.

RFS-HALFV tool has two sections (RFS and HALFV) which have multiple acoustic transducers with different ranges of operating frequencies. The RFS (resonant frequency sweeping) cartridge will utilize acoustic transducers with a wide range of operating frequencies to accommodate resonant frequencies of various formation types (sandstones, limestones, shales, dolomites, and heterogeneous reservoirs comprised of the mixture of above lithologies). The HALFV (high amplitude low frequency vibration) section of the tool has acoustic transducers with lower operating frequency ranges that will increase fluid displacement, and ultimate recoveries.

In the case when resonant frequencies of a reservoir are low, both units (RFS and HALFV) can be tuned to the appropriate resonant frequency and work in tandem. This will result in a larger volume stimulation, requiring less time and therefore lowering the operation cost.

The most effective stimulation will be achieved during stationary operation mode. The RFS-HALFV tool will be conveyed, positioned and anchored at the toe (bottom) of the well. Various tool conveyance methods in horizontal or highly deviated wells can be used such as pipe conveyed, coiled tubing, or tractor conveyed operations. In vertical wells wireline tool conveyance can be used, similar to conventional logging operations. Electrical power from the surface source will be transmitted through a cable and converted to acoustic energy which will be regulated by an electronic unit (providing frequency and amplitude measurements and adjustments) to achieve a maximum operating frequency range. Transducers will be operated in continuous or pulsed mode to adjust resonant frequencies due to non-linear/non-elastic rock response. This hysteresis effect is a function of mechanical properties of the porous media. The operation mode, duration, and resonant frequencies will be based on specific lithologies, reservoir properties (mechanical, petrophysical), in-situ conditions, and desired/effective stimulation depth. After resonant sweeping is completed, the tool will be moved to the next location, and anchored for the next stimulation. The number of stations 6 and inter-distance will depend on reservoir properties, desired stimulation volume, and cost.

The tool can also be operated in continuous low speed logging mode for near wellbore stimulation (removal of positive skin, clean-up, etc.).

The RFS-HALFV tool has vibration isolation devices (high damping material) at the top of each section and set of centralizers and/or hydraulically set packers at the bottom and the top of the tool.

MRT—Mechanical Resonance Tool

An alternative tool for non-fluid reservoir stimulation in some embodiments is a mechanical resonance tool (FIG. 7A and FIG. 7B) which will allow to achieve desired resonant frequencies by mechanical force of moving piston with two plates at the top of the piston and at the bottom of the piston. The plate at the top of the piston will hit stationary plate at the top of the tool when piston moves up and the plate at the bottom of the piston will hit stationary plate at the bottom of tool when piston moves down. Mechanically induced vibration will generate sound waves at frequencies of vibration which will be controlled from the surface and tuned to the resonant frequency of the stimulated formation. Electronic boards of the MRT tool will be powered through wireline cable and piston movements will be achieved though hydraulically pressured chambers at the bottom and the top of the piston's plates. The MRT tool can be operated in stationary mode or at low moving speed.

AMRF—Acoustic Multiple Resonant Frequencies Tool

Another tool for non-fluid reservoir stimulation in some embodiments is an acoustic multiple resonant frequencies Tool (FIG. 8) that will allow to stimulate reservoirs with multiple predetermined frequencies which will be determined for the highly heterogeneous lithological formations. The number of constant frequency transducers will vary and be determined based on lithotype, degree of heterogeneity, allowed tool length (can be restricted by horizontal wellbore undulations, etc.). The AMRF tool will be powered through wireline cable and can be operated in stationary mode or at low moving speed.

CTSV (Camerton Type Transducer Sound Vibration) Tool

Similar to AMRF tool, CTSV performs non-fluid reservoir stimulation in some embodiments with multiple fixed frequencies which will be determined for the highly heterogeneous lithological formations. The number of constant frequency transducers will vary and be decided based on lithotype, degree of heterogeneity and allowed tool length (can be restricted by horizontal wellbore undulations). The CTSV tool will be powered through wireline cable and can be operated in stationary mode or at low moving speed.

Phase 2 Heating—Dewatering

Upon completing resonant sweeping stimulation, the downhole equipment will be removed and the heating tube will be run into wellbore and positioned. Individual heating tubes will be prefabricated and run into wellbore using standard casing/tubing running procedures. The number of joints/heating pipes will be calculated based on the length of the section to be heated. Multiple heated intervals with non-heated sections will be designed and situated between heated sections for horizontal wellbore sections drilled outside of reservoir.

For electrical power supply, any type of commercial electricity generators can be used and electrical power control panel will be installed at the surface to regulate power/electricity supplied to the downhole heating tubes. Heating system can use AC power supply or modulated DC power supply and multiple downhole heating tubes for long reservoir sections or a single heating tube for a short reservoir section. The required heating temperatures will be calculated and adjusted for various reservoir types. The heating tubing design has unique features, such as a back-up second separate heating element, in case if the first heating element breaks. Both heating elements can be used simultaneously or single heating elements can be used alternatively depending on desired temperature to be achieved. Any type of downhole heater can be used: inductive heater, resistive heater, radio-frequency heater, etc.

The evaporated liquids (steam) will be produced through the well annulus by surface vapour suction pumps. Light hydrocarbon fractions in steam can be captured and separated during condensation process and separators. Cooling towers can be used at the surface to condense and cool steam to the heating temperature for geothermal or other applications.

DETAILED DESCRIPTIONS OF EXEMPLARY EMBODIMENT OF RFS-HALFV ILLUSTRATIONS

Figure 1:
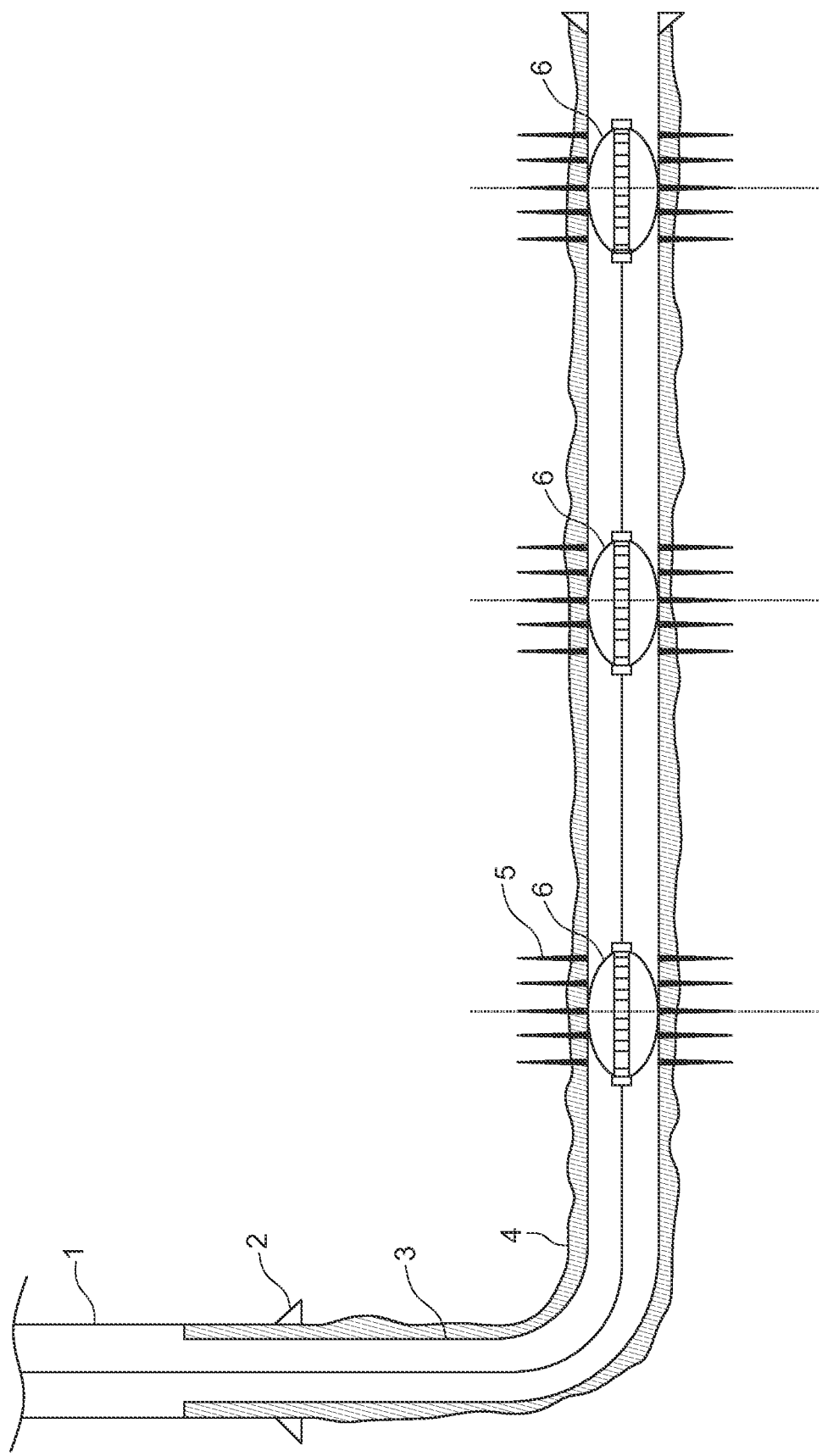
FIG. 1 illustrates a side view of a horizontal well system during a first phase of a non-fluid reservoir stimulation process while a high amplitude low frequency vibration/agitation (RFS-HALFV) tool is moved in the wellbore at a plurality of positions according to an exemplary embodiment.

FIG. 1 is one example of a well system with intermediate casing 1 and production casing 3. The intermediate casing shoe 2 is set above KOP (Kick Off Point). Production casing is cemented 4 and perforated 5. The RFS-HALFV tool is run into wellbore to the toe and pulled back to the first station 6, positioning the RFS section across perforated casing. The tool is centralized, anchored, and the resonant sweeping stimulation is performed. After completing the resonant sweeping, the tool is moved into the HALFV position, and the same interval is stimulated. Low frequency vibrations are generated by the second cartridge of the tool and complete the stimulation cycle. Upon completing stimulation of the first interval the tool is moved up to the next station 6, and so on.

Figure 2:
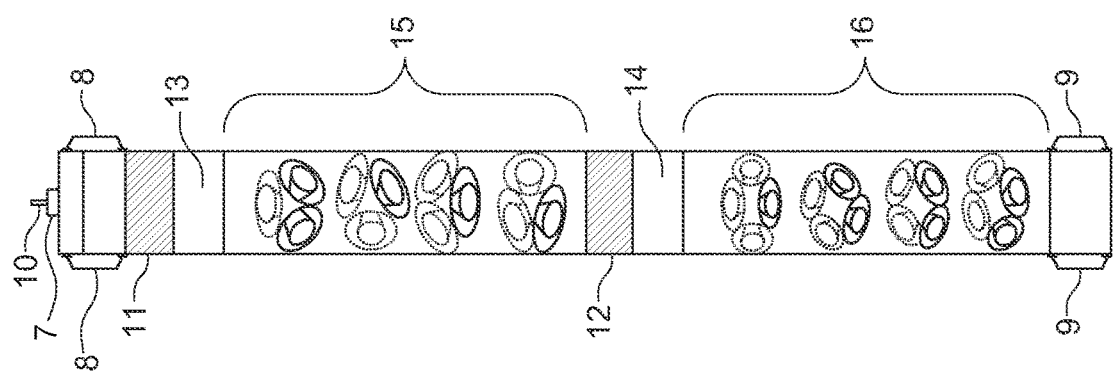
FIG. 2 illustrates a design of the resonant sweeping and high amplitude low frequency vibration/agitation (RFS-HALFV) tool according to an exemplary embodiment.

In FIG. 2, a RFS-HALFV tool design is illustrated. The tool is connected to an electrical cable 10 and pressurized air tube inlet for hydraulic packers (if used), located at the same position at the top 7 of the tool. Centralizers and/or packers 8 and 9 are located at the top and the bottom of the tool. RFS (resonant frequency sweeper) section 15 has electronic module 13 to measure and modulate resonant frequencies controlled by a central control panel at the surface. Generated frequencies will be attenuated by a damping device 11 installed in the upper part of the RFS module, thus protecting the string and borehole above the stimulation interval. The second section of the tool is HALFV (high amplitude low frequency vibration) module 16 mounted in the tool below the RFS section. HALFV has its own electronic module/sensor 14 to measure and adjust low frequencies to the required value(s), and another damping device 12 to eliminate the direct frequency disturbance to the upper RFS section of the tool, when both sections are operating at different frequencies.

Figure 3B:
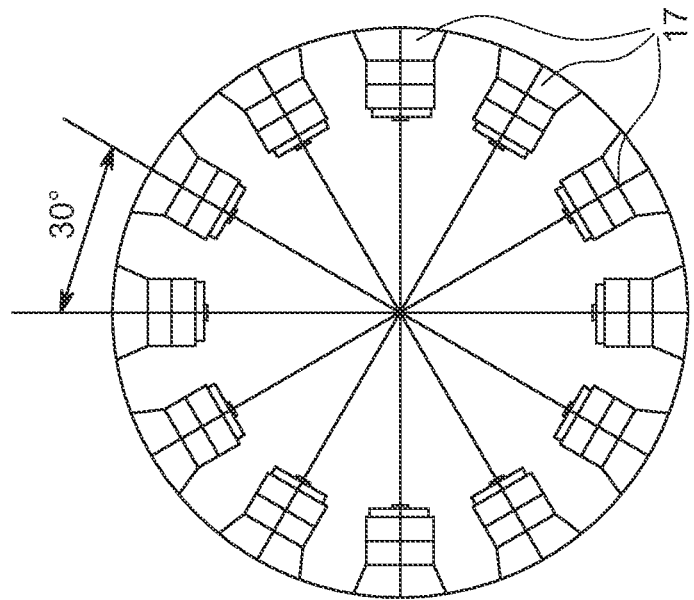
FIG. 3B illustrates a top view of the RFS module of FIG. 3A according to an exemplary embodiment.
Figure 3A:
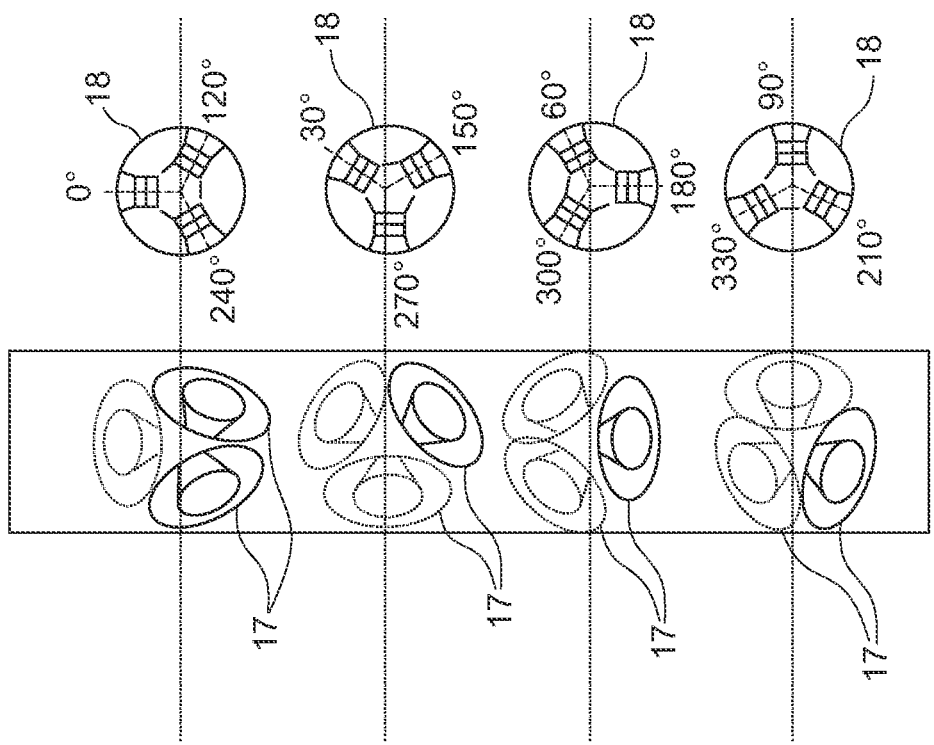
FIG. 3A illustrates a side view of a resonant frequency sweeping (RFS) module of the tool of FIG. 2 according to an exemplary embodiment.

In FIG. 3A the detailed image of the RFS module according to an exemplary embodiment is provided. The acoustic transducers 17 are mounted at four levels at 120 degrees spacing. On the first level acoustic transducers are positioned at zero degrees, 120 degrees and 240 degrees circumferentially. On the second level the transducers are shifted 30 degrees (30, 150 and 270 degrees). On the third level the transducers are shifted 60 degrees (60, 180, 300 degrees) and on the fourth level they are shifted 90 degrees (90, 210, 330 degrees), which is illustrated by level layouts 18. In FIG. 3B the acoustic transducers 17 are illustrated in the top view of the RFS module, providing 360-degree wellbore coverage with 12 transducers spaced 30 degrees circumferentially.

Figure 4B:
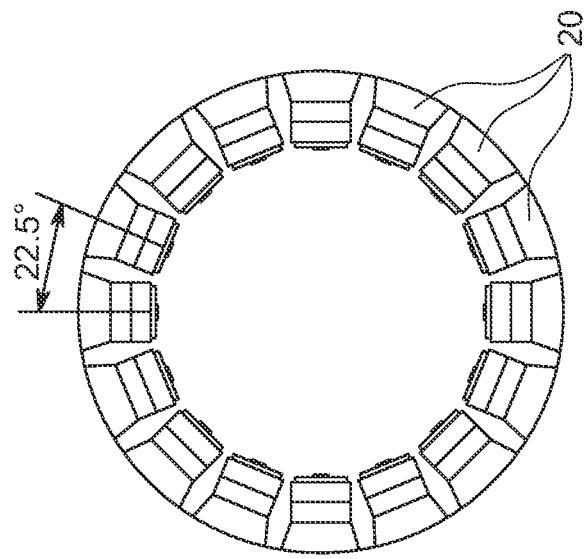
FIG. 4B illustrates a top view of the HALFV module of FIG. 4A according to an exemplary embodiment.
Figure 4A:
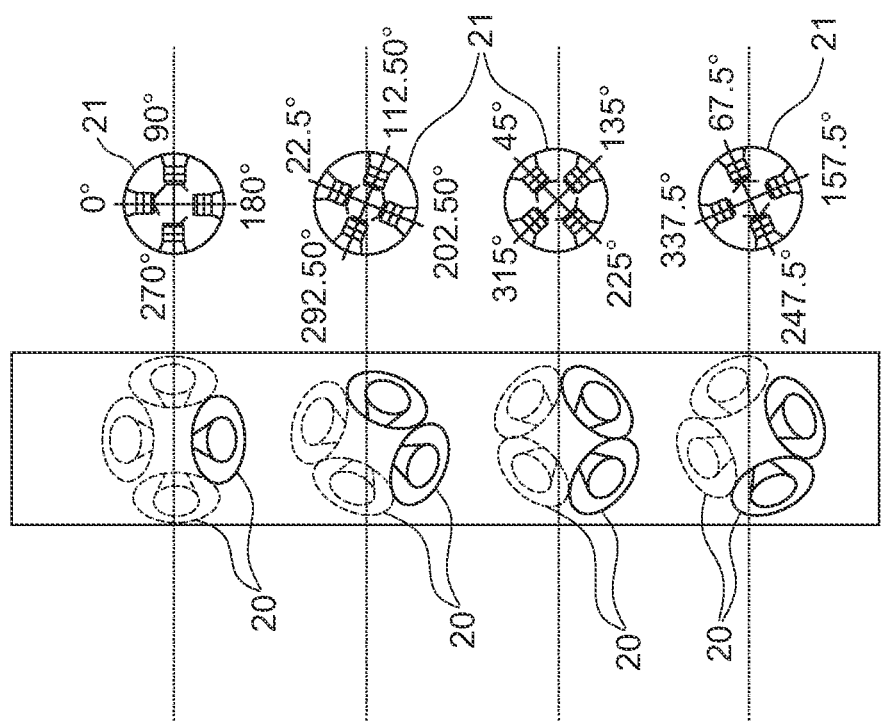
FIG. 4A illustrates a side view of a high amplitude low frequency vibration/agitation (HALFV) module of the tool of FIG. 2 according to an exemplary embodiment.

In FIG. 4A the detailed image of the HALFV module according to an exemplary embodiment is illustrated. The acoustic transducers 20 are mounted at four levels at 90 degrees spacing. On the first level acoustic transducers are positioned at 0, 90, 180 and 270 degrees circumferentially. On the second level the transducers are shifted 22.5 degrees (22.5, 112.5, 202.5 and 292.5 degrees). On the third level the transducers are shifted 45 degrees (45, 135, 225, 315 degrees) and on the fourth level they are shifted 67.5 degrees (67.5, 157.5, 247.5, 337.5 degrees) which is illustrated by level layouts 21. In FIG. 4B the acoustic transducers 20 are illustrated in the top view of the HALFV module, providing 360-degree wellbore coverage with 16 transducers spaced at 22.5 degrees circumferentially.

In FIG. 5, the second phase of the non-fluid reservoir stimulation process according to an exemplary embodiment is illustrated for the similar well system (cemented and perforated production casing). A heating tubing 28 is configured to the desired length (horizontal wellbore length in this illustrated example), and is connected to the tubing 33 using thread or any other type mechanical connection 29, and run into wellbore. Electrical power is supplied to the heating tube, generating a heat front 34 deep into formation behind the casing. A production pump 30 is set above the heel of the well and hydrocarbons are produced through tubing. Vaporized fluids (steam) is produced through annulus 31.

Figure 6C:
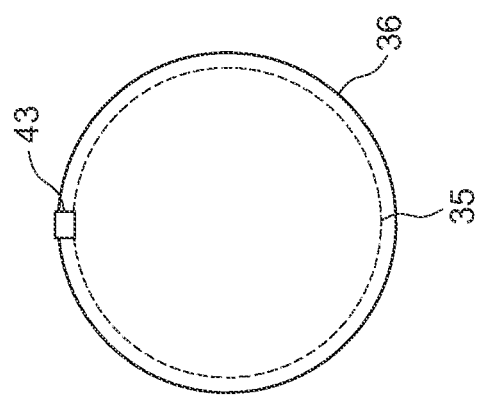
FIG. 6C illustrates a top view of the heating tube including the inner and outer tubes of FIGS. 6A and 6B rolled and assembled into a tubular structure according to an exemplary embodiment.
Figure 6B:
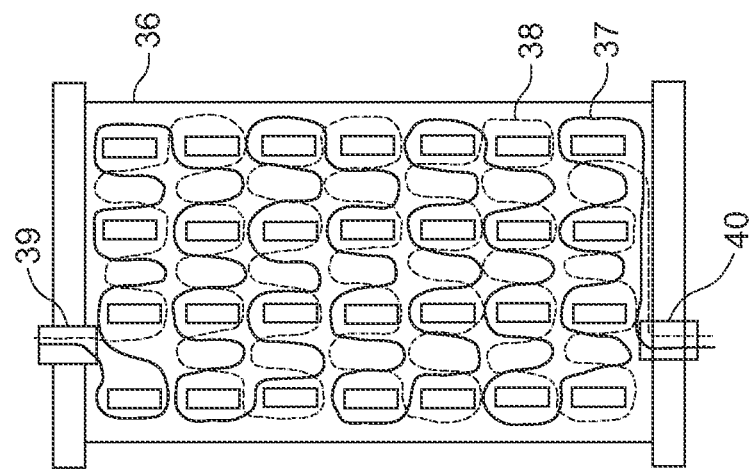
FIG. 6B illustrates a 360-degree side view of an outer tube with slots (can be perforated) and two heating elements prior to the inner tubing being rolled and welded into a tube structure according to an exemplary embodiment.
Figure 6A:
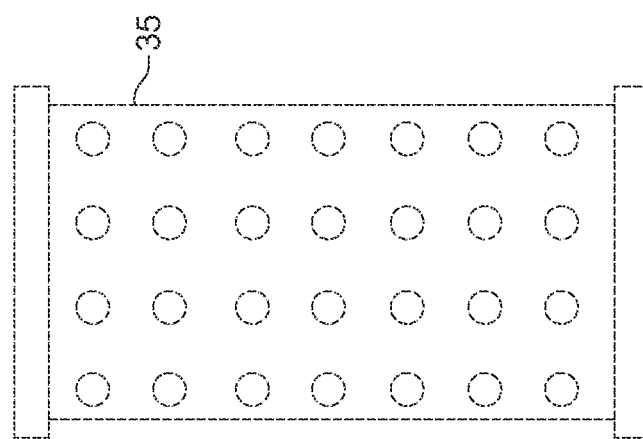
FIG. 6A illustrates a 360-degree side view of an inner tube of the heating tubing with perforations (can be slotted) and without the heating element prior to the inner tubing being rolled and welded into a tube structure according to an exemplary embodiment.

In FIGS. 6A, 6B and 6C the detailed description of the heating tube according to an exemplary embodiment is provided. In FIG. 6A, the inner tube 35 (360-degree view, will be rolled and welded) with perforations (can be slotted) and without heating element is illustrated. In FIG. 6B, the outer tube 36 with slots (can be perforated) and two heating elements 37, 38 is illustrated. Male/Female connectors 39, 40 are used to connect heating elements through open port 43 in the joint of heating tubing. In FIG. 6C the top view of the heating tube is illustrated. The single wall 6B heating tube can be used for the formation heating.

DETAILED DESCRIPTIONS OF EXEMPLARY EMBODIMENT OF MRT ILLUSTRATIONS

Figure 7A:
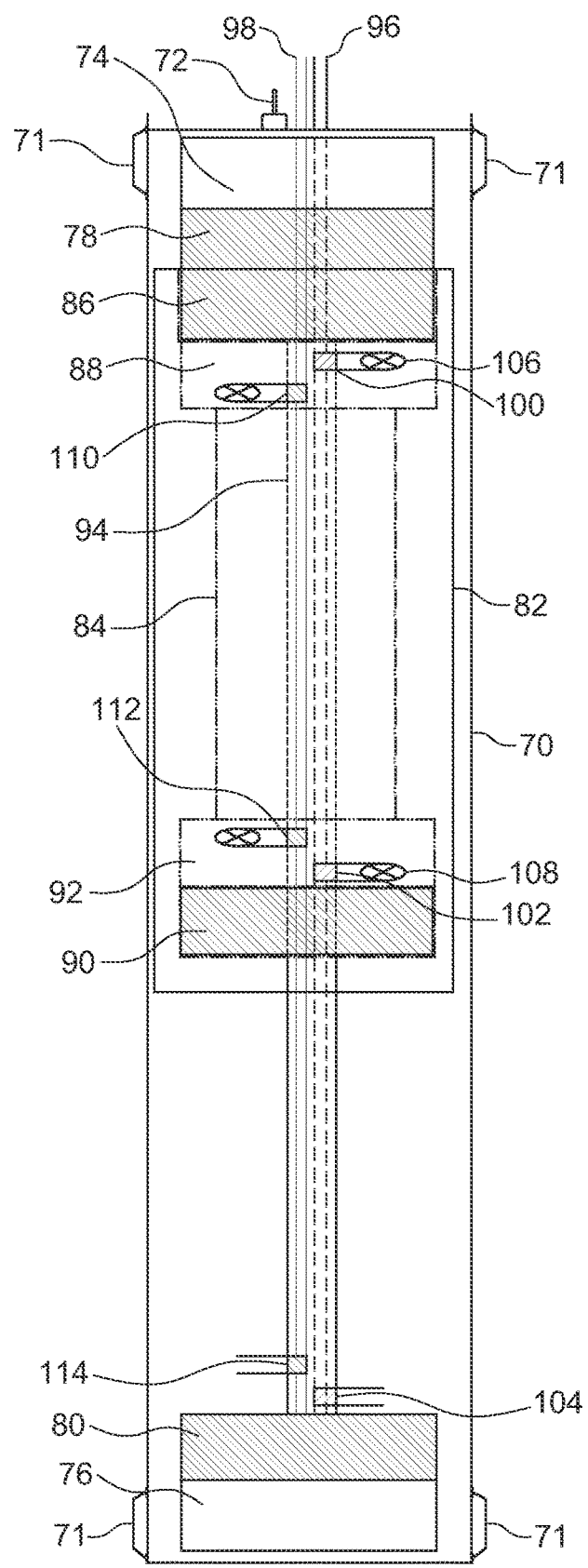
FIG. 7A illustrates a mechanical resonance tool for non-fluid reservoir stimulation having a piston in a top position according to an exemplary embodiment.
Figure 7B:
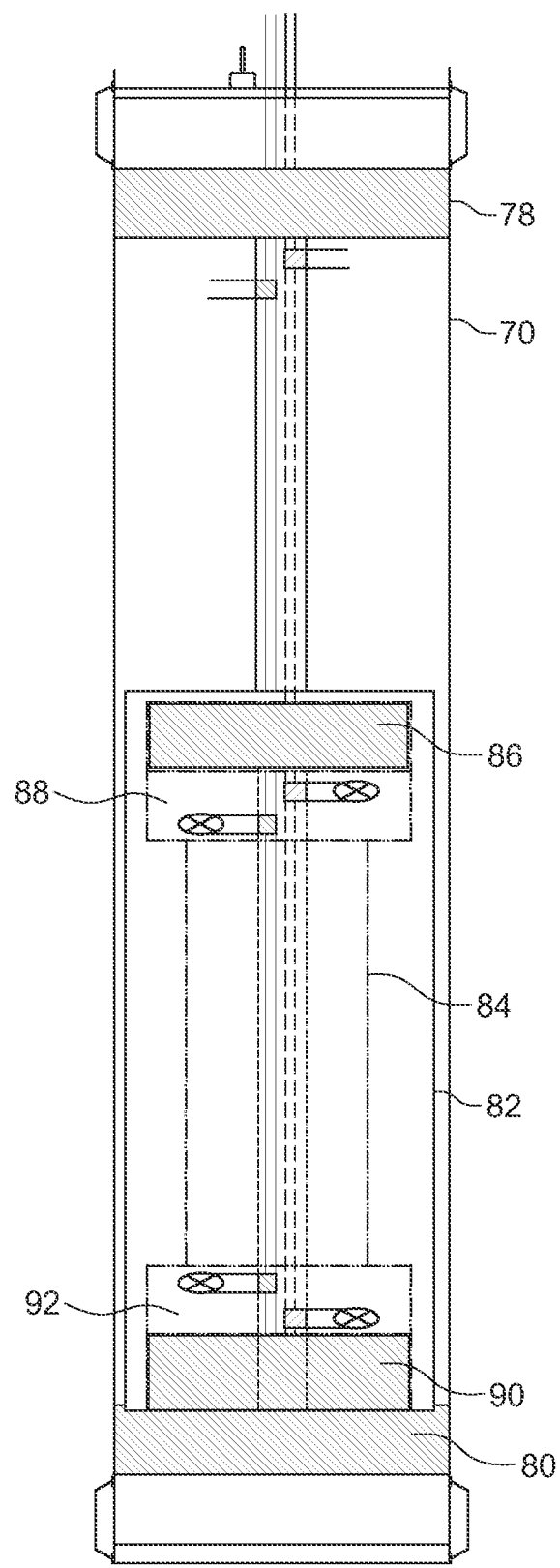
FIG. 7B illustrates the mechanical resonance tool of FIG. 7A for non-fluid reservoir stimulation having the piston in a bottom position according to an exemplary embodiment.

FIG. 7A illustrates the MRT tool 70 with piston 84 in the top position and FIG. 7B illustrates the MRT tool 70 with piston 84 in the bottom position. The MRT tool 70 is run into wellbore to the toe and pulled back to the first station, positioning the MRT tool 70 across desired stimulation interval. The tool 70 is centralized and anchored by mechanically operated centralizers or hydraulically set up packers 71. Resonant sweeping stimulation is performed by setting up predetermined frequencies at computerized control panel at the surface. After completing the resonant stimulation at specific frequency, the moving speed of the piston 84 can be changed to alter stimulation frequency to account for the heterogeneity of the formation for each stimulation zone. Upon completing stimulation of the first interval the tool 70 is moved up to the next station, and so on.

All electronics are powered through wireline connected to the tool 70 with cable head 72. The MRT tool 70 has two electronics cartridges at the top of the tool and at the bottom of the tool which have shock absorbing liners at the bottom of upper electronics cartridge 74 and at the top of bottom electronics cartridge 76. Upper stationary plate 78 has vibration frequency sensor built in and connected to the upper electronics cartridge 74. Lower stationary plate 80 has vibration frequency sensor built in and connected to the lower electronics cartridge 76.

Traveling block 82 consists of the piston 84, mobile resonant plate 86 at the top of the piston with pressure chamber 88 adjacent to the bottom of upper plate 86 of the piston 84 and mobile resonant plate 90 at the bottom of the piston 84 with another pressure chamber 92 adjacent to top of the lower resonant plate 90 of the piston 84. Both mobile plates 86, 90 have circular holes in the center. The piston 84 has circular hole in the center for positioning the piston 84 on a rod/shaft 94 to allow the piston 84 movements upwards and downwards. The rod 94 is attached to the bottom of the upper stationary plate 78 and to the top of the lower stationary plate 80. Inside the rod 94, a hydraulic pressure line 96 and a pressure release line 98 are located. Pressure line 96 supplies hydraulic pressure to pressure chambers 88, 92 through designed openings with latching devices and one-way (pressure flow into pressure chamber) valves (100, 102, 104) to latch on openings in pressure chambers 88, 92 when the piston 84 is in position to be pressured and pushed upwards or downwards. Upper chamber pressure sensor 106 and lower chamber pressure sensor 108 will detect maximum reached pressures required to move the piston 84. Pressure release line 98 has refabricated openings with latching devices and one-way (pressure release from the pressure chamber into pressure release line) valves 110, 112, 114.

When lower pressure chamber 92 is pressurized, the piston 84 shoots down and piston's lower plate 90 hits stationary plate 80 at the bottom of the tool 70. Mechanical vibration induced acoustic wave is generated and propagates omnidirectionally into formation. Immediately after impact the pressure is released from lower pressure chamber 92 and upper pressure chamber valve opens 110 and upper chamber 88 starts being pressurized. When required pressure is obtained the piston 84 moves upwards and upper piston's plate 86 hits stationary plate 78 at the top of the tool 70. Again, mechanical vibration induced acoustic wave is generated and propagates omnidirectionally into formation. Immediately after impact the pressure is released from upper pressure chamber 88 and lower pressure chamber valve 112 opens and lower chamber 92 starts being pressurized. The cycles repeat at certain predetermined piston travel frequencies.

Stationary and mobile piston's plates 86, 90, 78, 80 will be manufactured from various materials to achieve required resonant frequencies in specific applications.

DETAILED DESCRIPTIONS OF EXEMPLARY EMBODIMENT OF AMRF ILLUSTRATIONS

Figure 8:
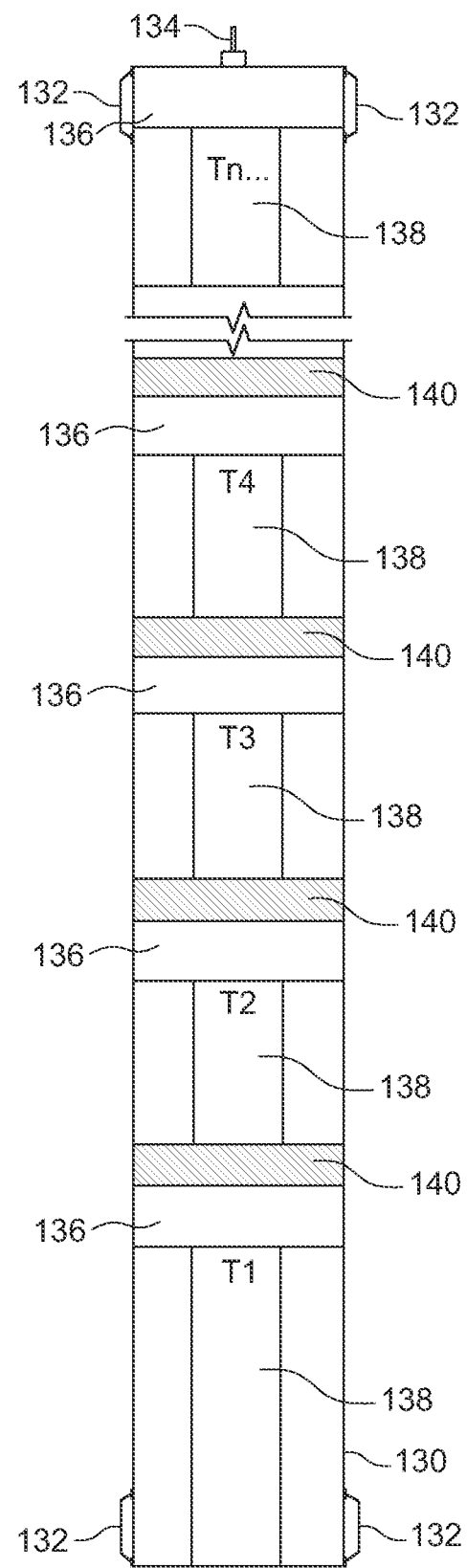
FIG. 8 illustrates an acoustic multiple resonant frequencies tool for non-fluid reservoir stimulation according to an exemplary embodiment.

FIG. 8 illustrates the AMRF tool 130. The AMRF tool 130 is run into wellbore to the toe and pulled back to the first station, positioning the AMRF tool 130 across planned stimulation interval. The tool 130 is centralized and anchored by mechanically operated centralizers or hydraulically set up packers 132. Resonant sweeping stimulation at multiple fixed frequencies is performed and monitored by control panel at the surface. After completing the resonant stimulation with range of constant frequencies to account for the heterogeneity of the formation the tool is moved up to the next station, and so on.

All electronics are powered through wireline connected to the tool with cable head 134. The AMRF tool 130 has electronics cartridge 136 at the top of each transducer 138 and frequency dampening plate 140 at the bottom of each transducer. Omnidirectional transducers 138 emit acoustic waves at predetermined fixed frequency for the time duration required to achieve resonance effect which will be registered by electronical circuits at the top of transducers 138. Each transducer 138 can work independently and some transducers 138 can be switched off if the fixed frequency of the specific transducer 138 doesn't match resonant frequency of the formation.

DETAILED DESCRIPTIONS OF EXEMPLARY EMBODIMENT OF CTSV ILLUSTRATIONS

Figure 9:
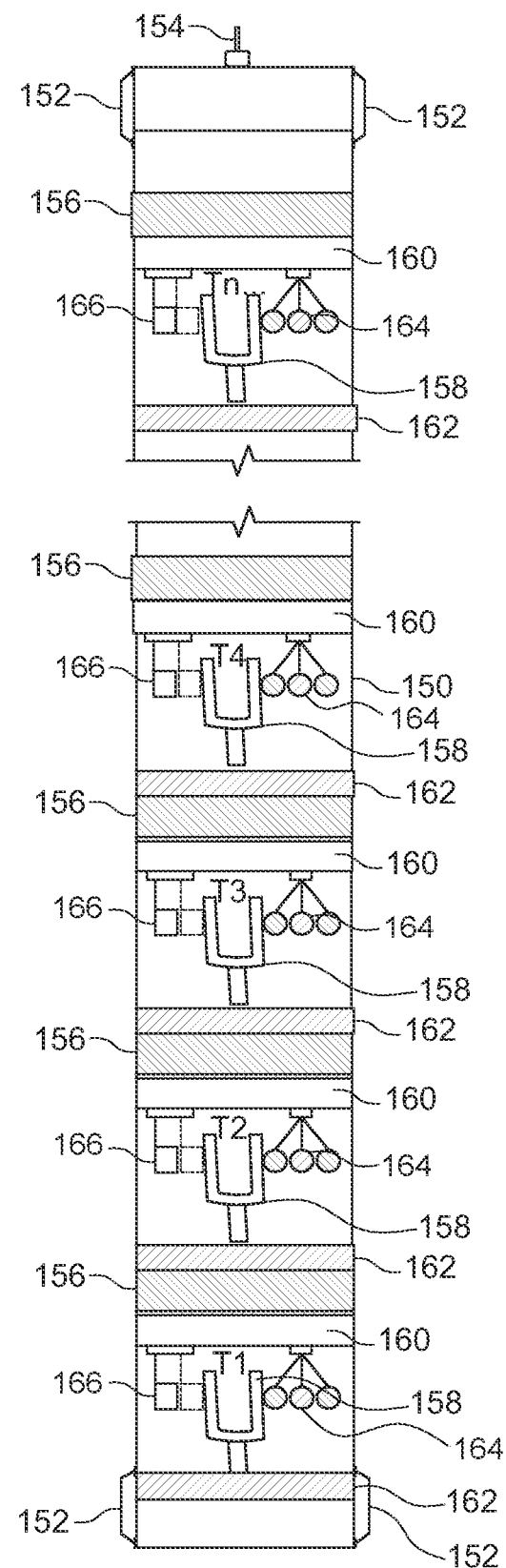
FIG. 9 illustrates a Camerton type transducer sound vibration tool for non-fluid reservoir stimulation according to an exemplary embodiment.

FIG. 9 illustrates the CTSV tool 150. The CTSV tool 150 is run into wellbore to the toe and pulled back to the first station, positioning the CTSV tool 150 across planned stimulation interval. The tool 150 is centralized and anchored by mechanically operated centralizers or hydraulically set up packers 152. Resonant sweeping stimulation at multiple fixed frequencies is performed and monitored by control panel at the surface. After completing the resonant stimulation with range of constant frequencies to account for the heterogeneity of the formation the tool 150 is moved up to the next station, and so on.

All electronics are powered through wireline connected to the tool with cable head 154. The CTSV tool 150 has electronics cartridge 156 at the top of Camerton transducer 158 activation and deactivation cartridge 160. Each transducer 158 is mounted on a frequency dampening plate 162 at the bottom of each transducer section and includes a pendulum-type stroker 164 and vibration stopping pad 166. Omnidirectional transducers 158 emit acoustic waves at predetermined fixed frequency for the time duration required to achieve resonance effect which will be registered by electronics. Each transducer 158 can work autonomously and some transducers 158 can be switched off if the fixed frequency of the specific transducer 158 doesn't match resonant frequency of the formation.

Although the invention has been described in connection with preferred embodiments, it should be understood that various modifications, additions and alterations may be made to the invention by one skilled in the art without departing from the spirit and scope of the invention. For example, the above steps/phases of the process are according to an exemplary embodiment. The steps/phases of the process are not restricted to the exact order described, and, in other configurations, described steps/phases may be omitted or other intermediate steps/phases added. Functions of single units may be separated into multiple units, or the functions of multiple units may be combined into a single unit. All combinations and permutations of the above described features and embodiments may be utilized in conjunction with the invention.

What is claimed is:

1. A process of non-fluid reservoir stimulation utilizing a downhole tool of deployed from a surface into a wellbore; the downhole tool comprising:
a wireline cable connection at a top of the downhole tool for electric connection to a control panel at the surface;
an electronic module;
a top dampener for attenuating vibrations between the electronic module and the top of the downhole tool; and
a means for generating vibrations at a plurality of different frequencies coupled to the electronic module and located below the top dampener;
wherein the electronic module is configured to measure vibration frequencies for monitoring by the control panel at the surface, and to modulate the means for generating vibrations to generate the different frequencies of vibrations as controlled by the control panel at the surface; and
the process comprising:
estimating resonant sweeping frequencies for specific rock types of a target formation;
moving the downhole tool to a plurality of stations within the wellbore; and
at each station, modulating the means for generating vibrations to perform a sequence and duration of resonant frequency sweeps and high amplitude low frequency vibrations.

2. The process of claim 1, further comprising modulating the means for generating vibrations to perform the sequence and duration of resonant frequency sweeps and high amplitude low frequency vibrations during continuous low speed movement of the downhole tool from a toe to a heel of the wellbore.

3. The process of claim 1, wherein, after the sequence is complete, the process further comprising removing the downhole tool and heating the wellbore by insertion of a heating tube.

4. The process of claim 3, further comprising dewatering with extraction of vaporized fluids by vacuum suction at the surface during well production.

5. A downhole tool for deployment from a surface into a wellbore, the downhole tool comprising:
a wireline cable connection at a top of the downhole tool for electric connection to a control panel at the surface;
an electronic module;
a top dampener for attenuating vibrations between the electronic module and the top of the downhole tool; and
a means for generating vibrations at a plurality of different frequencies coupled to the electronic module and located below the top dampener;
wherein the electronic module is configured to measure vibration frequencies for monitoring by the control panel at the surface, and to modulate the means for generating vibrations to generate the different frequencies of vibrations as controlled by the control panel at the surface; and the means for generating vibrations comprises:
- a resonant frequency sweeper (RFS) section having twelve acoustic transducers mounted at four levels, each level having three acoustic transducers separated from one another by 120° spacing circumferentially around a perimeter of the downhole tool; and
- a high amplitude low frequency vibration (HALFV) section having sixteen acoustic transducers mounted at four levels, each level having four acoustic transducers separated from one another by 90° spacing circumferentially around the perimeter of the downhole tool.

6. The downhole tool of claim 5, wherein a top view of the means for generating vibrations shows the twelve acoustic transducers of the resonant frequency sweeper (RFS) section spaced evenly around the perimeter of the downhole tool, each acoustic transducer of the resonant frequency sweeper (RFS) section spaced 30° circumferentially.

7. The downhole tool of claim 5, wherein:
- a first level of the resonant frequency sweeper (RFS) section includes three acoustic transducers respectively spaced circumferentially at 0°, 120° and 240°;
- a second level of the resonant frequency sweeper (RFS) section includes three acoustic transducers respectively spaced circumferentially at 30°, 150°, and 270°;
- a third level of the resonant frequency sweeper (RFS) section includes three acoustic transducers respectively spaced circumferentially at 60°, 180°, and 300°; and
- a fourth level of the resonant frequency sweeper (RFS) section includes three acoustic transducers respectively spaced circumferentially at 90°, 210°, and 330°.

8. The downhole tool of claim 5, wherein a top view of the means for generating vibrations shows the sixteen acoustic transducers of the high amplitude low frequency vibration (HALFV) section spaced evenly around the perimeter of the downhole tool, each acoustic transducer of the high amplitude low frequency vibration (HALFV) section spaced 22.5° circumferentially.

9. The downhole tool of claim 5, wherein:
- a first level of the high amplitude low frequency vibration (HALFV) section includes four acoustic transducers respectively spaced circumferentially at 0°, 90°, 180°, and 270°;
- a second level of the high amplitude low frequency vibration (HALFV) section includes four acoustic transducers respectively spaced circumferentially at 22.5°, 112.5°, 202.5°, and 292.5°;
- a third level of the high amplitude low frequency vibration (HALFV) section includes four acoustic transducers respectively spaced circumferentially at 45°, 135°, 225°, and 315°; and
- a fourth level of the high amplitude low frequency vibration (HALFV) section includes four acoustic transducers respectively spaced circumferentially at 67.5°, 157.5°, 247.5°, and 337.5°.

10. The downhole tool of claim 5, further comprising another vibration dampener positioned between the resonant frequency sweeper (RFS) section and the high amplitude low frequency vibration (HALFV) section for attenuating vibrations between the resonant frequency sweeper (RFS) section and the high amplitude low frequency vibration (HALFV) section.

11. The downhole tool of claim 5, further comprising one or more centralizers located at the top and a bottom of the downhole tool.

12. The downhole tool of claim 5, further comprising:
- one or more hydraulic packers located at the top and a bottom of the downhole tool; and
- a pressurized air tube inlet at the top of the downhole tool for driving each of the hydraulic packers disposed on the downhole tool.

13. A downhole tool for deployment from a surface into a wellbore, the downhole tool comprising:
- a wireline cable connection at a top of the downhole tool for electric connection to a control panel at the surface;
- an electronic module;
- a top dampener for attenuating vibrations between the electronic module and the top of the downhole tool; and
- a means for generating vibrations at a plurality of different frequencies coupled to the electronic module and located below the top dampener;
- wherein the electronic module is configured to measure vibration frequencies for monitoring by the control panel at the surface, and to modulate the means for generating vibrations to generate the different frequencies of vibrations as controlled by the control panel at the surface; and
- the means for generating vibrations comprises:
  - an upper stationary plate;
  - a lower stationary plate;
  - a piston having an upper resonant plate for impacting the upper stationary plate and a lower resonant plate for impacting the lower stationary plate;
  - an upper pressure chamber adjacent to a bottom of the upper resonant plate of the piston;
  - a lower pressure chamber adjacent to a top of the lower resonant plate of the piston;
  - a rod attached to the bottom of the upper stationary plate and to a top of the lower stationary plate along which the piston moves downwards and upwards driven by pressure releases from the upper pressure chamber and the lower pressure chamber, respectively; and
  - a plurality of valves controlled by the electronic module to pressurize and depressurize the upper pressure chamber and lower pressure chamber;
  - wherein the electronic module is configured to control pressurization of the upper pressure chamber and the lower pressure chamber such that a pressure release from the upper pressure chamber pushes the piston down the rod so that the lower resonant plate hits the lower stationary plate thereby causing a first mechanical vibration and induced acoustic wave, and such that a pressure release from the lower pressure chamber pushes the piston up the rod so that the upper resonant plate hits the upper stationary plate thereby causing a second mechanical vibration and induced acoustic wave.

14. The downhole tool of claim 13, wherein the electronic module is configured to repeat a cycle of pressurizing the upper pressure chamber and lower pressure chamber at a predetermined one of a plurality of different piston travel frequencies as controlled by the control panel at the surface.

15. A downhole tool for deployment from a surface into a wellbore, the downhole tool comprising:
- a wireline cable connection at a top of the downhole tool for electric connection to a control panel at the surface;
- an electronic module;
- a top dampener for attenuating vibrations between the electronic module and the top of the downhole tool; and a means for generating vibrations at a plurality of different frequencies coupled to the electronic module and located below the top dampener;

wherein the electronic module is configured to measure vibration frequencies for monitoring by the control panel at the surface, and to modulate the means for generating vibrations to generate the different frequencies of vibrations as controlled by the control panel at the surface; and the means for generating vibrations comprises:
- a plurality of omnidirectional acoustic transducers mounted at a plurality of different levels; and
- a plurality of dampeners, wherein a respective one of the dampeners is mounted between adjacent omnidirectional acoustic transducers for attenuating vibrations therebetween;
- wherein each of the omnidirectional acoustic transducers emits acoustic waves at a fixed frequency different from other acoustic waves of other omnidirectional acoustic transducers; and
- the electronic module is configured to modulate the omnidirectional acoustic transducers by selectively turning on and off different ones of the omnidirectional acoustic transducers to cause each omnidirectional acoustic transducer to emit a respective fixed frequency for a predetermined time duration as controlled by the control panel at the surface.

16. A downhole tool for deployment from a surface into a wellbore, the downhole tool comprising:
- a wireline cable connection at a top of the downhole tool for electric connection to a control panel at the surface;
- an electronic module;
- a top dampener for attenuating vibrations between the electronic module and the top of the downhole tool; and
- a means for generating vibrations at a plurality of different frequencies coupled to the electronic module and located below the top dampener;

wherein the electronic module is configured to measure vibration frequencies for monitoring by the control panel at the surface, and to modulate the means for generating vibrations to generate the different frequencies of vibrations as controlled by the control panel at the surface; and the means for generating vibrations comprises:
- a plurality of Camerton transducers mounted at a plurality of different levels; and
- a plurality of dampeners, wherein a respective one of the dampeners is mounted between adjacent Camerton transducers for attenuating vibrations therebetween;
- wherein the electronic module is configured to modulate the Camerton transducers by selectively turning on and off different ones of the Camerton transducers as controlled by the control panel at the surface.

* * * * *